US012434509B2

(12) United States Patent
Kmiecik et al.

(10) Patent No.: US 12,434,509 B2
(45) Date of Patent: Oct. 7, 2025

(54) AIRCRAFT TIRE WITH ZONED TREAD (71) Applicant: The Goodyear Tire & Rubber Company, Akron, OH (US)

(72) Inventors: Frank Anthony Kmiecik, Akron, OH (US); Allen Todd Mathis, Cleveland, OH (US); Bret Herbert Marts, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/593,492

(22) Filed: Mar. 1, 2024

(65) Prior Publication Data
US 2024/0253400 A1 Aug. 1, 2024

Related U.S. Application Data (63) Continuation-in-part of application No. 17/810,017, filed on Jun. 30, 2022.

(60) Provisional application No. 63/260,754, filed on Aug. 31, 2021.

(51) Int. Cl.
*B60C 11/00* (2006.01)

(52) U.S. Cl.
CPC ...... *B60C 11/0041* (2013.01); *B60C 11/0008* (2013.01); *B60C 2011/0025* (2013.01); *B60C 2200/02* (2013.01)

(58) Field of Classification Search
CPC . B60C 11/00; B60C 11/0041; B60C 11/0008; B60C 11/0058
See application file for complete search history.

(56) References Cited

U.S. PATENT DOCUMENTS

| 4,385,653 A | 5/1983 | Okazaki et al. | |
|---|---|---|---|
| 2004/0112490 A1* | 6/2004 | Sandstrom | B60C 11/005 152/209.5 |
| 2005/0209370 A1* | 9/2005 | Zhang | C08L 21/00 523/333 |
| 2008/0066838 A1 | 3/2008 | Zhang et al. | |
| 2008/0146719 A1* | 6/2008 | Yang | C08K 3/346 524/445 |

(Continued)

FOREIGN PATENT DOCUMENTS

| JP | 2001206013 A * | 7/2001 |
| WO | 0026044 A1 | 5/2000 |
| WO | 2020247663 A1 | 12/2020 |

OTHER PUBLICATIONS

Chinese Office Action for Application No. 20221056426.X, dated Mar. 13, 2025.

*Primary Examiner* — Cedrick S Williams
(74) *Attorney, Agent, or Firm* — Katherine A. Smith (57) ABSTRACT

The invention provides a pneumatic tire having a tire tread with a ground engaging outer surface. The tread further has a first or central tread zone located on the central or crown portion of the tread and formed of a first rubber compound. Additionally, the tread has a second or shoulder tread zone located axially outward of the first or central tread zone on each lateral end of the tread. The second or shoulder tread zone is formed of a second rubber compound. In one example, the first rubber compound has a G' (at 50% strain) in the range of 1.6 to 1.8 MPa. In another example, the second rubber compound has a G' (at 100% strain) in the range of 800 to 830 KPa.

20 Claims, 5 Drawing Sheets (56) References Cited

U.S. PATENT DOCUMENTS

2014/0107284 A1   4/2014  Nebhani
2018/0326790 A1*  11/2018 Joulin ................... B60C 1/0016

* cited by examiner

AIRCRAFT TIRE WITH ZONED TREAD

CROSS-REFERENCE TO RELATED APPLICATIONS

This application claims priority to U.S. Provisional Ser. No. 63/260,754 (the "'754 provisional"), filed Aug. 31, 2021. This application is also a continuation-in-part of U.S. patent application Ser. No. 17/810,017, filed Jun. 30, 2022, which also claims priority to the '754 provisional. These applications are incorporated herein by reference in their entireties.

FIELD OF THE INVENTION

This invention relates to pneumatic tires, and more particularly, to high-speed heavy load tires such as those used on aircraft.

BACKGROUND OF THE INVENTION

Figure 2:
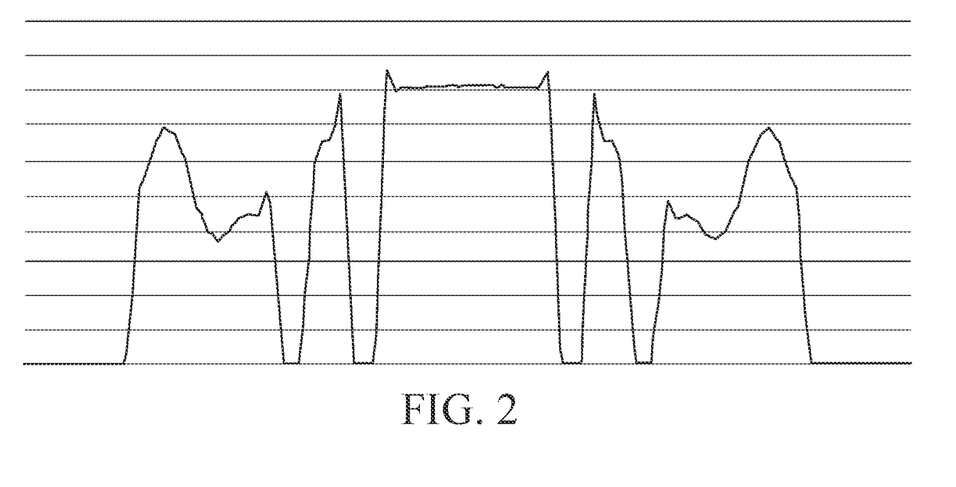
FIG. 2 is a computer model plot of tire tread wear indicator vs. y-coordinate.

Current tire design drivers for an aircraft tire include designing the tire for high wear resistance. FIG. 2 illustrates a computer simulation of a comprehensive wear model showing the amount from various aircraft activities such as touch down, taxing, turning. The central part of the tire tread has the greatest wear. The outer lateral ends of the tire tread near the shoulder also have high wear. The state of the art of high wear resistant tire treads is to select tread compounds that have high stiffness or high abrasion resistance for improved wear resistance. However, the present inventors have discovered an improved wear resistant tread that is contrary to the state of the art.

SUMMARY OF THE INVENTION

The invention provides in a first aspect a pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, wherein the first rubber compound has a G' (at 50% strain) in the range of 1.6 to 1.8 MPa.

The invention provides in a second aspect a pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, wherein the second rubber compound has a G' (at 100% strain) in the range of 800 to 830 KPa.

Definitions

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane" and "EP" mean the plane perpendicular to the tire's axis of rotation and passing through the center of its tread.

"Ply" means a continuous layer of rubber-coated parallel cords.

"Radial" and "radially" mean directions radially toward or away from the axis of rotation of the tire.

"Radial-ply tire" means a belted or circumferentially restricted pneumatic tire in which the ply cords which extend from bead to bead are laid at cord angles between 65° and 90° with respect to the equatorial plane of the tire.

BRIEF DESCRIPTION OF THE DRAWINGS

The invention will be described by way of example and with reference to the accompanying drawings in which.

DETAILED DESCRIPTION OF THE INVENTION

Figure 1:
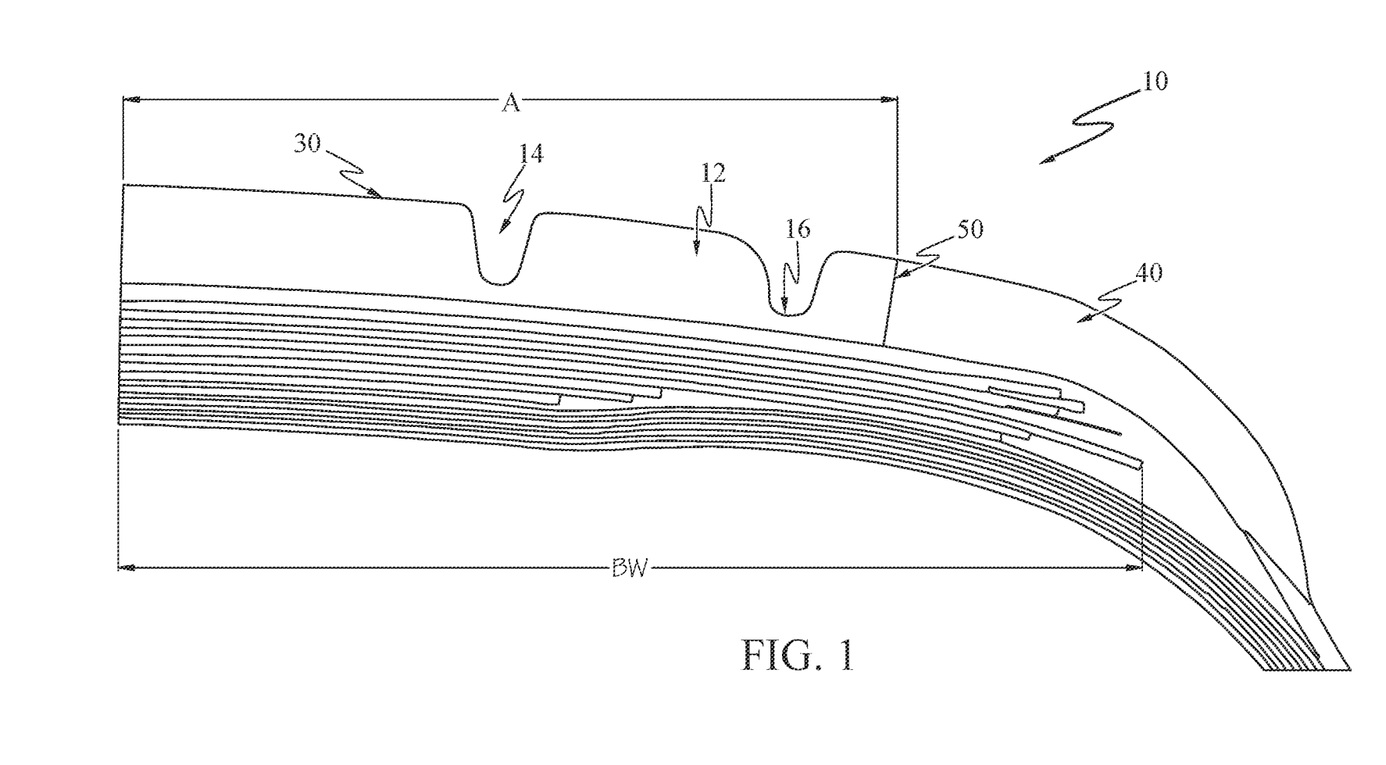
FIG. 1 is a schematic cross-sectional view of a first embodiment of half of a zoned tire tread according to the invention.

FIG. 1 illustrates a cross-sectional view of one half of a pneumatic tire tread 10 of the present invention. The tire is symmetrical about the mid-circumferential plane so that only one half is illustrated. As shown, the tire tread 10 is for an aircraft tire, although the invention is also applicable to other uses such as truck or off the road tires.

The tire tread 10 defines an outer running surface 12 that includes a plurality of grooves 14, 16 separated by tread blocks or ribs. The tire tread 10 is zoned and has a first or central tread zone 30 formed of a first rubber compound and is located on the central or crown portion of the tire tread 10. The tire tread 10 further comprises a second or shoulder tread zone 40 formed of a second rubber compound. The second tread zone 40 is located axially outward of the first or central tread zone 30 on each lateral end of the tire tread 10. The second tread zone 40 extends from a tire tread interface 50 to the shoulder region terminating at the sidewall.

FIG. 2 illustrates a computer simulation of a comprehensive wear model illustrating the amount of wear caused by events such as takeoff, landing (touch down) taxing, turning, and braking. As shown in FIG. 2, in the shoulder tread zone 40 at the outer lateral ends of the tire tread 10, there is shown a large increase in wear.

Figure 3:
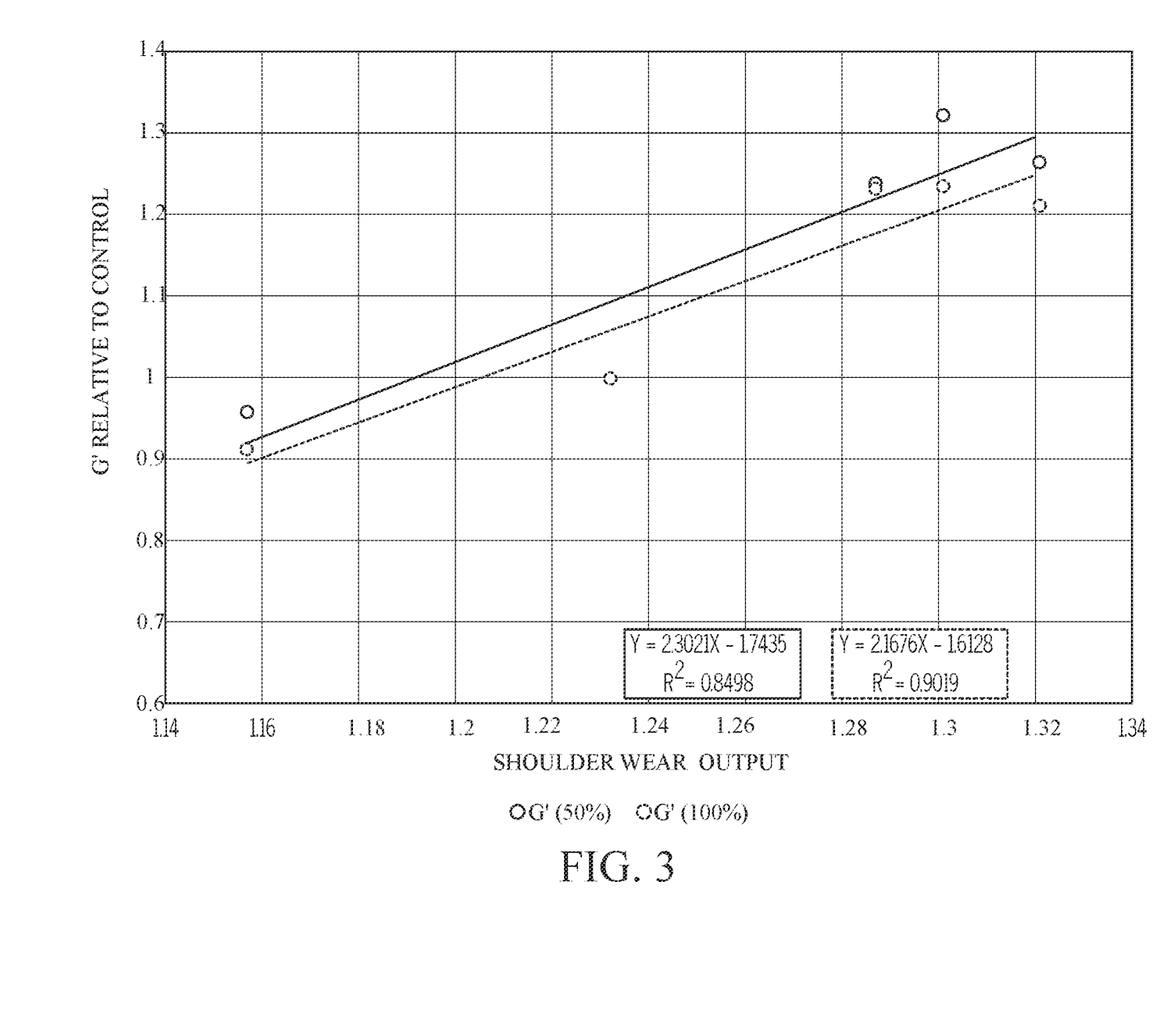
FIG. 3 is a computer model plot of relative G' vs. shoulder wear.

FIG. 3 illustrates that shoulder wear for an aircraft tire correlates strongly with high strain G', or G' (measured at 50%-100% strain) with an $R^2 > 0.8$. G' is the dynamic storage modulus and is a measurement of the viscoelastic properties of rubber compounds at various strain levels. G' may be obtained using a Rubber Process Analyzer as RPA 2000™ from the Alpha Technologies. Such measurements are known to those of ordinary skill in the art. These measurements are typically made on green rubber. For example, using the RPA 2000™, a strain sweep at 100° C. at 1 Hz over a range of from 1% to 100% strain may be made.

Additionally, FIG. 3 illustrates the shoulder wear rate for various compounds having different stiffness levels. FIG. 3 illustrates that the shoulder wear rate is lowest for the softer compounds, i.e., lower G' values at high strain. In one embodiment, G' of the second rubber compound for the shoulder or second tread zone 40 is selected to have a G' (at 100% strain) in the range of 810,000 to 830,000 MPa, and more preferably about 820,000 MPa. In a second embodiment, G' of the second rubber compound for the shoulder or second tread zone 40 is selected to have a G' (at 50% strain) in the range of 1.024 to 1.028 MPa, or 1.02 MPa to 1.03 MPa, and more preferably about 1.026 MPa. In a third embodiment, G' of the second rubber compound for the shoulder or second tread zone 40 is selected to have a G' (at 100% strain) in the range of 810 to 830 KPa, or 0.81 to 0.83 MPa, and more preferably about 820 KPa, or 0.82 MPa.

Figure 4:
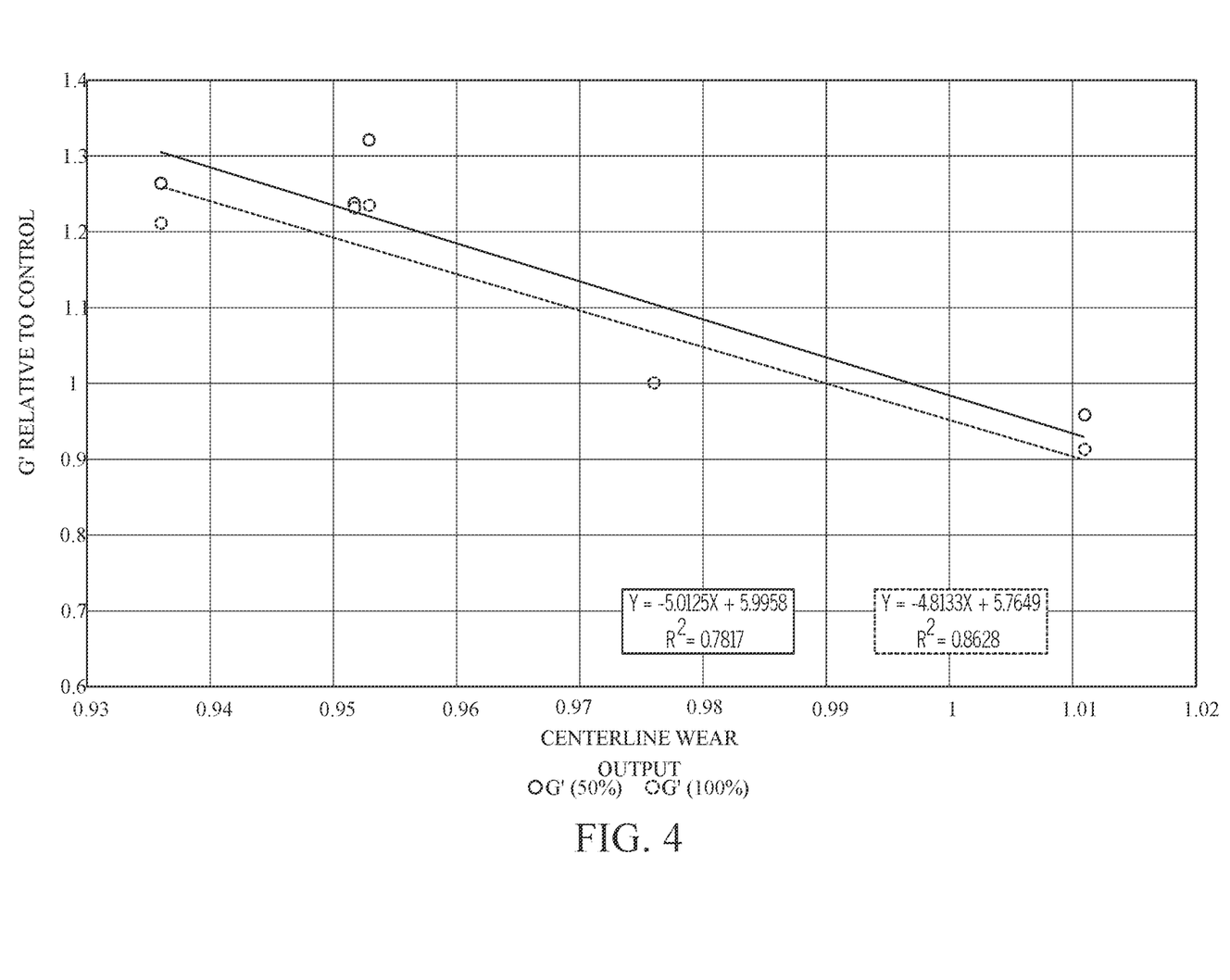
FIG. 4 is a computer model plot of relative G' vs. centerline tread wear.

FIG. 4 illustrates the centerline wear rate for the tire tread 10 versus G' at various strain levels. From FIG. 4, it has been determined that centerline wear correlates strongly with G' at 100% strain. Centerline wear is reduced for compounds higher in stiffness, i.e., higher values of G' (at 100% strain). Thus, for the first or central tread zone 30 it is preferred that the G' (100%) of the first rubber compound be in the range of 1.2 to 1.4 MPA, and more preferably about 1.3 MPA. Additionally, for the first or central tread zone 30 it is preferred that the G' (at 50% strain) of the first rubber compound be in the range of 1.6 to 1.8 MPa, more preferably, about 1.7 MPA.

Figure 5:
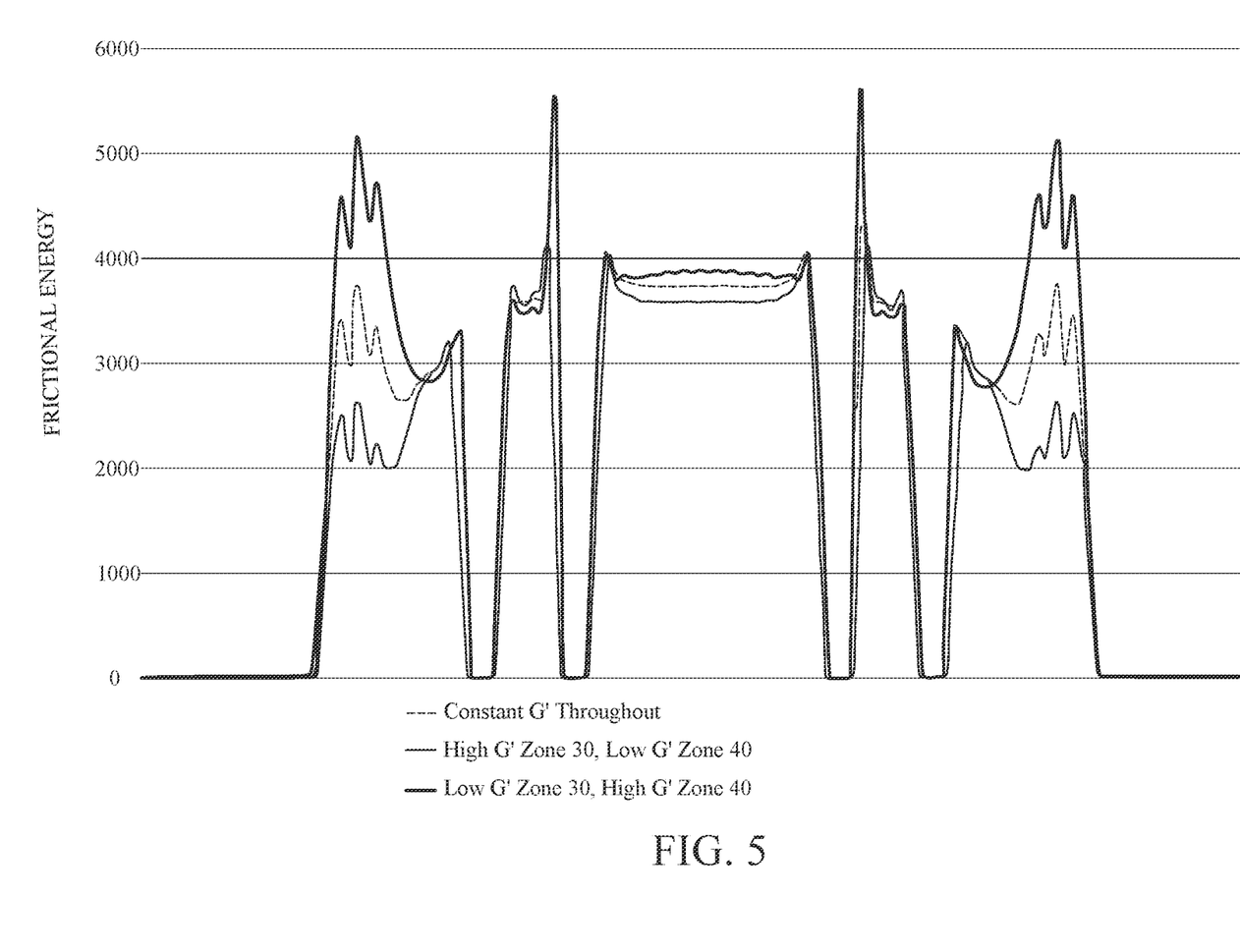
FIG. 5 is a computer model plot of overall wear of the tread having three different zoned tread compositions.

FIG. 5 illustrates the overall wear rate of the tire tread 10 using first and second tread zones 30, 40 for different types of compounds. Thus, tread zoning improves the wear balance of the tire tread 10, while slightly improving centerline tread wear.

Accordingly, in order to improve the overall wear rate of the tire tread 10, it is desired to have a first or central tread zone 30 formed of a first rubber compound having a G' (50%) at least 150% greater than the G' (at 50% strain) of the second rubber compound, and more preferably, at least 170% greater than the G' (at 50% strain) of the second rubber compound.

The first rubber compound is selected to have a greater stiffness than the second rubber compound so as to provide the tread with greater wear resistance along the first or central tread zone 30, and the second rubber compound provides the tread with a softer compound that reduces shoulder wear. The interface 50 or dividing line between the first and second tread zones 30, 40 is determined from modeling analysis such as shown in FIG. 2. As shown in FIG. 5, the tread wear is highest at the outer lateral ends of the tread, and lower in the central portion of the tread. For a typical tire tread, the first or central tread zone 30 is preferably at least 50-70% of the total tread arc width, and the combined outer lateral ends are preferably at least 30-50% of the total tread arc width.

Referring again to FIG. 5, the graph illustrates that a stiffness differential between a first rubber compound of the central or first tread zone 30 and a second rubber compound of the shoulder or second tread zone 40 is structurally critical to reducing overall tread wear. That is, where the tire tread 10 has a central or first tread zone 30 that is formed of a first rubber compound having a high G' (measured at 50% to 100% strain) value and a shoulder or second tread zone 40 that is formed of a second rubber compound having a low G' (measured at 50% to 100% strain) value, tread wear is reduced in both the central or first tread zone 30 and the shoulder or second tread zone 40. Stated another way, where the tire tread 10 has a central or first tread zone 30 that is formed of a first rubber compound having a high stiffness and a shoulder or second tread zone 40 that is formed of a second rubber compound having a low stiffness, wherein rubber compound stiffness is an isolated variable, tread wear is reduced in both the central or first tread zone 30 and the shoulder or second tread zone 40. As a result, a tire tread having a low stiffness rubber compound applied across a full footprint of the tire tread 10 wears at a faster rate in a shoulder or second tread zone 40 than the tire tread 10 having the same low stiffness rubber compound applied only in the shoulder or second tread zone 40 and a high stiffness rubber compound in the central or first tread zone 30.

Simple shear G' may be obtained using ASTM D5992 on a dynamic testing machine from Metravib Engineering. Such measurements are known to those of ordinary skill in the art. These measurements are typically made on cured rubber. For example, using the dynamic testing machine, a strain sweep at various Celsius temperatures at 10 Hz over a range of from 1% to 100% strain may be made.

In an effort to effectively characterize the first and second rubber compounds across strain ranges, as shear modulus G' is difficult to measure at 100% strain or more, tensile modulus E was measured at 0% to 200% strain of the first and second rubber compounds to supplement the shear modulus G' data. Tensile modulus E may be obtained using ASTM D412 on a tensile tester such as a tensile tester from Instron®. Such measurements are known to those of ordinary skill in the art. These measurements are typically made on cured rubber. For example, using the tensile tester, a strain sweep at room temperature (typically 27° C.) temperatures at quasi-static conditions over a range of from 0% to material break strength strain may be made.

To further improve overall wear rate of the tire tread 10, in an embodiment, the central or first tread zone 30 is selected to have a first rubber compound having a simple shear G' (at 50% strain), measured at 27° C. and at 10 Hz, in a range of 1.0 MPa to 2.0 MPa, and preferably about 1.7 MPa, and the shoulder or second tread zone 40 is selected to have a second rubber compound having a simple shear G' (at 50% strain), measured at 27° C. and at 10 Hz, in a range of 0.6 MPa to 1.2 MPa, and preferably about 0.8 MPa. In another embodiment, the central or first tread zone 30 is selected to have a first rubber compound having a tensile modulus E (at 50% strain), measured at 27° C., in a range of 1.2 MPa to 2.4 MPa, and preferably about 2.0 MPa, and the shoulder or second tread zone 40 is selected to have a second rubber compound having a tensile modulus E (at 50% strain), measured at 27° C., in a range of 0.9 MPa to 1.7 MPa, and preferably about 1.1 MPa. In still another embodiment, the central or first tread zone 30 is selected to have a first rubber compound having a tensile modulus E (at 100% strain), measured at 27° C., in a range of 2.3 MPa to 4.6 MPa, and preferably about 3.8 MPa, and the shoulder or second tread zone 40 is selected to have a second rubber compound having a tensile modulus E (at 100% strain), measured at 27° C., in a range of 1.4 MPa to 2.6 MPa, and preferably about 1.7 MPa. In a further embodiment, the central or first tread zone 30 is selected to have a first rubber compound having a tensile modulus E (at 150% strain), measured at 27° C., in a range of 3.8 MPa to 7.7 MPa, and preferably about 6.4 MPa, and the shoulder or second tread zone 40 is selected to have a second rubber compound having a tensile modulus E (at 150% strain), measured at 27° C., in a range of 2.0 MPa to 3.8 MPa, and preferably about 2.5 MPa. In an additional embodiment, the central or first tread zone 30 is selected to have a first rubber compound having a tensile modulus E (at 200% strain), measured at 27°

C., in a range of 5.8 MPa to 11.5 MPa, and preferably about 9.6 MPa, and the shoulder or second tread zone 40 is selected to have a second rubber compound having a tensile modulus E (at 200% strain), measured at 27° C., in a range of 3.0 MPa to 5.6 MPa, and preferably about 3.7 MPa.

Moreover, to further improve overall wear rate of the tire tread 10, in an embodiment, the central or first tread zone 30 is selected to have a first rubber compound having a simple shear G' (at 50% strain), measured at 27° C. and at 10 Hz, at least 150% greater than a simple shear G' (at 50% strain), measured at 27° C. and at 10 Hz, of a second rubber compound of the shoulder or second tread zone 40. In another embodiment, the central or first tread zone 30 is selected to have a first rubber compound having a simple shear G' (at 50% strain), measured at 27° C. and at 10 Hz, in a range of 125% to 325% greater than a simple shear G' (at 50% strain), measured at 27° C. and at 10 Hz, of a second rubber compound of the shoulder or second tread zone 40, preferably in a range of 210% to 325% greater, and more preferably 210% greater. In a further embodiment, the central or first tread zone 30 is selected to have a first rubber compound having a tensile modulus E (at 50% strain), measured at 27° C., in a range of 125% to 325% greater than a tensile modulus E (at 50% strain), measured at 27° C., of a second rubber compound of the shoulder or second tread zone 40, preferably in a range of 180% to 325% greater, and more preferably 180% greater. In another embodiment, the central or first tread zone 30 is selected to have a first rubber compound having a tensile modulus E (at 100% strain), measured at 27° C., in a range of 125% to 325% greater than a tensile modulus E (at 100% strain), measured at 27° C., of a second rubber compound of the shoulder or second tread zone 40, preferably in a range of 220% to 325% greater, and more preferably 220% greater. In an additional embodiment, the central or first tread zone 30 is selected to have a first rubber compound having a tensile modulus E (at 150% strain), measured at 27° C., in a range of 125% to 325% greater than a tensile modulus E (at 150% strain), measured at 27° C., of a second rubber compound of the shoulder or second tread zone 40, preferably in a range of 250% to 325% greater, and more preferably 250% greater. In a still further embodiment, the central or first tread zone 30 is selected to have a first rubber compound having a tensile modulus E (at 200% strain), measured at 27° C., in a range of 125% to 325% greater than a tensile modulus E (at 200% strain), measured at 27° C., of a second rubber compound of the shoulder or second tread zone 40, preferably in a range of 255% to 325% greater, and more preferably 255% greater.

In an embodiment, the first or central tread zone 30 is preferably at least 50-80%, and more preferably 60-80%, of the total tread arc width, and the shoulder or second tread zones 40 are preferably at least 20-50%, and more preferably 20-40%, of the total tread arc width.

As shown in FIG. 1, the tire tread 10 is for a new tire. However, the zoned tire tread 10 of the present disclosure is also applicable to retreading, which is a process of replacing a worn tread layer on a tire with a new tread layer. In an example retread application of the present disclosure, a tire tread is the same as tire tread 10 in all respects and has a central or first tread zone 30 that is formed of the same first rubber compound as the tire tread 10 and a shoulder or second tread zone 40 that is formed of the same second rubber compound as the tire tread 10. In another example retread application of the present disclosure, a tire tread is the same as tire tread 10 in all respects, except a central or first tread zone 30 is formed of a first rubber compound that is different from the tire tread 10, such that that the first rubber compound may be tuned for processing differences and be less stiff or stiffer. Additionally, in the same example, a shoulder or second tread zone 40 is formed of a second rubber compound that is different from the tire tread 10, such that that the second rubber compound may be tuned for processing differences and be less stiff or stiffer.

Another benefit of the stiffness differential between the first and second rubber compounds of the central or first tread zone 30 and the shoulder or second tread zone 40, respectively, is that the stiffness differential allows for optimization of other compound properties of the first and second rubber compounds. For example, a low stiffness second rubber compound of the shoulder or second tread zone 40 may be less hysteretic, which will advantageously reduce heat generation and improve dynamic integrity.

Additionally, tread wear is usually considered in terms of abraidability, which is the loss of rubber resulting from mechanical action, including frictional energy, on a tread surface. The central or first tread zone 30 experiences a very high severity abraidability mechanism from a high-speed touchdown event, and the shoulder or second tread zone 40 experiences, comparatively, a much lower severity and conventional abraidability mechanism from the remaining aspects of a typical aircraft tire mission profile that consists of events, including but not limited to, takeoff, taxi, cornering, and braking events. As high and low severity abraidability are very different in mechanism, high and low severity abraidability may be independently optimized for abraidability by region within the tire tread 10. When the central or first tread zone 30 and the shoulder or second tread zone 40 are targeted with a stiffness differential of 125%-325%, abrasion resistance at high and low severity can be more advantageously and independently optimized.

Furthermore, a high stiffness first rubber compound in the central or first tread zone 30 may result in a high penetration energy to maximize cut resistance.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, and wherein the first rubber compound has an E (at 150% strain) in a range of 125% to 325% greater than E (at 150% strain) of the second rubber compound, wherein the E (at 150% strain) of each of the first and the second rubber compounds is measured at 27° C.

2. The pneumatic tire of claim 1, wherein the E (at 150% strain) of the first rubber compound is 250% greater than the E (at 150% strain) of the second rubber compound.

3. The pneumatic tire of claim 1, wherein an axial width of the first tread zone is in a range of 60-80% of a total arc width of the tread.

4. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, and wherein the first rubber compound has a G' (at 50% strain) at least 150% greater than a G' (at 50% strain) of the second rubber compound.

5. The pneumatic tire of claim 4, wherein an axial width of the first tread zone is in a range of 60-80% of a total arc width of the tread.

6. The pneumatic tire of claim 4, wherein a combined axial width of the second tread zone on each lateral end of the tread is at least 20-40% of a total arc width of the tread.

7. The pneumatic tire of claim 4, wherein the first rubber compound has a G' (at 50% strain) that is 150% to 325% greater than a G' (at 50% strain) of the second rubber compound.

8. The pneumatic tire of claim 7, wherein the G' (at 50% strain) of each of the first and the second rubber compounds is measured at 27° C. and at 10 Hz.

9. The pneumatic tire of claim 8, wherein the G' (at 50% strain) of the first rubber compound is in a range of 1.0 MPa to 2.0 MPa and the G' (at 50% strain) of the second rubber compound is in a range of 0.6 MPa to 1.2 MPa.

10. The pneumatic tire of claim 9, wherein the G' (at 50% strain) of the first rubber compound is 1.7 MPa and the G' (at 50% strain) of the second rubber compound is 0.8 MPa.

11. A pneumatic tire having a tread with a ground engaging outer surface, the tread having a first tread zone and a second tread zone, wherein the first tread zone includes a central portion of the tread and the second tread zone is located adjacent the first tread zone and on each lateral end of the tread, wherein the first tread zone is formed of a first rubber compound and the second tread zone is formed of a second rubber compound, and wherein the first rubber compound has an E (at 100% strain) in a range of 125% to 325% greater than an E (at 100% strain) of the second rubber compound, wherein the E (at 100% strain) of each of the first and the second rubber compounds is measured at 27° C.

12. The pneumatic tire of claim 11, wherein an axial width of the first tread zone is in a range of 60-80% of a total arc width of the tread.

13. The pneumatic tire of claim 11, wherein the E (at 100% strain) of the first rubber compound is in a range of 220% to 325% greater than the E (at 100% strain) of the second rubber compound.

14. The pneumatic tire of claim 13, wherein the E (at 100% strain) of the first rubber compound is 220% greater than the E (at 100% strain) of the second rubber compound.

15. The pneumatic tire of claim 14, wherein the E (at 100% strain) of the first rubber compound is in a range of 2.3 MPa to 4.6 MPa, and the E (at 100% strain) of the second rubber compound is in a range of 1.4 MPa to 2.6 MPa.

16. The pneumatic tire of claim 15, wherein the E (at 100% strain) of the first rubber compound is 3.8 MPa and the E (at 100% strain) of the second rubber compound is 1.7 MPa.

17. The pneumatic tire of claim 11, wherein an axial width of the second tread zones is at least 20-40% of a total arc width of the tread.

18. The pneumatic tire of claim 17, wherein the E (at 150% strain) of the first rubber compound is in a range of 250% to 325% greater than the E (at 150% strain) of the second rubber compound.

19. The pneumatic tire of claim 18, wherein the E (at 150% strain) of the first rubber compound is in a range of 3.8 MPa to 7.7 MPa, and the E (at 150% strain) of the second rubber compound is in a range of 2.0 MPa to 3.8 MPa.

20. The pneumatic tire of claim 18, wherein the E (at 150% strain) of the first rubber compound is 6.4 MPa and the E (at 150% strain) of the second rubber compound is 2.5 MPa.

* * * * *